United States Patent [19]

Babian et al.

[11] 4,066,582
[45] Jan. 3, 1978

[54] IMPROVED ACRYLATE BASED RADIATION CURABLE COATING COMPOSITIONS CONTAINING NITROCELLULOSE

[75] Inventors: Gunther William Babian, Peekskill; Edward Bruce Harris, Spring Valley, both of N.Y.

[73] Assignee: Union Carbide Corporation, New York, N.Y.

[21] Appl. No.: 726,733

[22] Filed: Sept. 27, 1976

[51] Int. Cl.² .............................................. C08L 1/18
[52] U.S. Cl. .............................. 260/17 A; 204/159.12; 204/159.16
[58] Field of Search ........................... 260/17 A, 17 R; 204/159.12, 159.16

[56] References Cited

U.S. PATENT DOCUMENTS

| | | | |
|---|---|---|---|
| 3,749,592 | 7/1973 | Gaske et al. | 260/17 A |
| 3,770,602 | 11/1973 | D'Alelio | 260/17 A |
| 3,840,448 | 10/1974 | Osborn et al. | 204/159.16 |
| 3,912,670 | 10/1975 | Huemmer et al. | 260/17 A |

*Primary Examiner*—Edward M. Woodberry
*Attorney, Agent, or Firm*—Peter R. Shearer

[57] ABSTRACT

Addition of a small amount by weight of nitrocellulose to certain acrylate or methacrylate containing radiation curable coating compositions greatly inhibits penetration of the uncured compositions into porous substrates such as paper or paperboard.

9 Claims, No Drawings

IMPROVED ACRYLATE BASED RADIATION CURABLE COATING COMPOSITIONS CONTAINING NITROCELLULOSE

BACKGROUND OF THE INVENTION

Increasing restrictions on the amount and types of volatiles which may be released in work environments have prompted the development of radiation curable coating compositions which are free of volatile solvents that must be evaporated during the curing of the composition. These solvent-free coating compositions are known as 100 percent reactive systems; that is, each component of the composition reacts and becomes incorporated into the cured coating when the composition is exposed to radiation. Particularly useful as reactive components in radiation curable coating compositions are monofunctional or polyfunctional acrylate or methacrylate esters.

In many instances, it is desired to apply an acrylate or methacrylate containing radiation curable composition as a clear protective coating to a porous substrate such as, for example, paper or paperboard. A problem has been observed in such applications in that the uncured coating composition has a tendency to penetrate into the porous substrate. Consequently, a portion of the coating composition which has penetrated into the substrate remains substantially uncured and causes a permanent greying, or wet staining, of the coated substrate. To date no completely satisfactory method has been devised for inhibiting penetration into a porous substrate by an acrylate or methacrylate containing radiation curable composition for a sufficient period of time to allow the composition to be cured to a solid state.

SUMMARY OF THE INVENTION

We have discovered that the addition of a small amount of nitrocellulose to certain radiation curable coating compositions containing acrylates or methacrylates greatly inhibits the penetration of the uncured composition into a porous substrate, yet allows the coating composition to remain sufficiently fluid that it can easily be applied by conventional coating techniques. Our findings were completely unexpected and nonobvious, since previously known methods of inhibiting penetration into porous substrates generally involved raising the viscosity of the uncured compositions to a level which made application of the uncured compositions by conventional methods difficult.

DESCRIPTION OF THE INVENTION

The radiation curable coating compositions which are useful in this invention are any of the acrylate or methacrylate-based systems known to those skilled in the art, provided that such system contains at least 10 weight percent of an oligomeric polyacrylate or polymethacrylate. While the upper limit of the concentration of the oligomeric polyacrylate or polymethacrylate is not critical, there is generally less than 40 weight percent present in the radiation curable coating composition, since a higher concentration usually results in unacceptably high viscosity of the uncured composition. The oligomeric polyacrylate or polymethacrylate is a compound which has a molecular weight from about 800 to 5,000, preferably from about 1,500 2,500. It contains an average of from about 1 to about 8 acrylyl or methacrylyl groups per 1,000 molecular weight units.

Many such compounds are known in the art and no attempt will be made to enumerate them all herein. However, one can mention as illustrative of suitable oligomeric polyacrylates or polymethacrylates the acrylic acid or methacrylic acid esters of epoxidized fatty oils such as linseed, soybean, cottonseed or hempseed oil, which are described in detail in U.S. Pat. Nos. 3,125,592, 3,224,989 and 3,256,225; the diacrylyl compounds obtained by the reaction of two moles of an hydroxyalkyl acrylate or an hydroxyalkyl methacrylate with one mole of an isocyanato terminated polyester or polyether prepolymer as described in U.S. Pat. No. 3,700,643; or mixtures of the foregoing. This list is meant to be illustrative only and does not exclude any other oligomeric polyacrylates or polymethacrylates conforming to the above description which are known by those skilled in the art to have utility in the preparation of radiation curable coating compositions.

In addition to the oligomeric polyacrylate or polymethacrylate component, there can also be present any other polyfunctional or monofunctional acrylates or methacrylates which are useful in producing radiation curable coatings. These are well known to those skilled in the art and require no further description for them to know what they are. Nevertheless, one can mention as illustrative thereof acrylic acid, acrylamide, methyl acrylate, hexyl acrylate, 2-ethylhexyl acrylate, butoxyethoxy acrylate, neopentyl glycol diacrylate, bicyclo [2.2.1]hept-2-yl acrylate, dicyclopentyl acrylate, pentaerythritol mono- or di- triacrylate or mixtures thereof, isodecyl acrylate, trimethylolpropane mono- or di- or triacrylate or mixtures thereof, 2-phenoxyethyl acrylate, glycidyl acrylate, 2-methoxyethyl acrylate, 2-(N,N-diethylamino)ethyl acrylate, omega-methoxyethyl (hendecaoxyethylene) acrylate, omega-tridecoxyethyl (hendecaoxyethylene) acrylate, trimethoxyallyloxymethyl acrylate, ethylene glycol diacrylate, bicyclo [2.2.1]hept-2-en-5,6-diyl diacrylate, vinyl acrylate, 2-hydroxypropyl acrylate, 2-hydroxyethyl acrylate, (methyl carbamyl)ethyl acrylate and the corresponding methacrylates. It is known to those skilled in the art that the acrylate or methacrylate-based radiation curable systems described herein may additionally contain a small amount of polymerizable non-acrylyl-bearing compounds containing the ethylenically unsaturated group of the structure

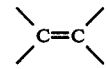

Those skilled in the art are fully aware that when non-ionizing radiation is used to cure the coating composition a photoiniator, or photosensitizer, is usually present in the composition. Suitable photoinitiators are well known to those skilled in the art. Nevertheless, one can mention as illustrative thereof benzophenone, acetophenone, fluorenone, xanthone, thioxanthone, carbazole, benzoin, the allyl benzoin ethers, 2- or 3- or 4-bromoacetophenone, 3- or 4- allylacetophenone, m- or p-diacetylbenzene, 2- or 3- or 4-methoxybenzophenone, 3,3'- or 3,4'- or 4,4'-dimethoxybenzophenone, 4-chloro-4'-benzylbenzophenone, 2- or 3-chloroxanthone, 3,9-dichloroxanthone, 2- or 3-chlorothioxanthone, 3-chloro-8-nonylxanthone, 3-methoxyanthone, 3-iodixanthone, 2-acetyl-4-methylphenyl acetate, alkyl and aryl ethers of benzoin, phenylglyoxal alkyl acetals, 2,2'- dimethoxy-2-phenyl-acetophenone, 2,2-diethoxyacetophenone, 2,2-diiso-propoxyacetophenone, 1,3-diphenyl acetone, naphthalene sulfonyl chloride, and mixtures thereof. As suitable activators that can be used in combination with the aforementioned photoinitiators one can mention methylamine, tributylamine, methyldiethanolamine, 2-aminoethylethanolamine, allylamine, cyclohexylamine, cyclopentadienylamine, diphenylamine, ditolylamine, trixylylamine, tribenzylamine, N-cyclohexylethylenimine, piperidine, 2-methylpiperidine, N-ethylpiperidine, 1,2,3,4-tetrahydropyridine, 2- or 3- or 4-picoline, morpholine, N-methylmorpholine, piperazine, N-methylpiperazine, 2,2-dimethyl-1,3-bis-(3-N-morpholinyl) propionyloxy)) diethyl ether, and mixtures thereof.

The radiation curable compositions which are useful in this invention can also contain any additives such as catalysts, flatting agents, pigments, slip additives, etc., which are conventionally employed in radiation curable coatings, in the usual effective amounts.

Those skilled in the art will know the proper component proportions and methods for producing radiation curable compositions from the foregoing components.

As previously indicated, our invention is concerned with inhibiting penetration of the uncured compositions into porous substrates by the addition of nitrocellulose thereto. The nitrocellulose is added to the radiation curable coating composition at a concentration of from about 0.25 to about 9 weight percent, and preferably from 1 to 3 weight percent thereof. The nitrocellulose employed has a viscosity of from about ¼ second to ½ second, measured by the falling ball method described in ASTM D301-56(65) and D1343-56 (65), and an average nitrogen content of from 10.9 to 12.2.%. The nitrocellulose can be added to the radiation curable coating composition as a dry resin or in a compatible organic solvent. Solvents which are compatible with nitrocellulose are known by those skilled in the art and require no further description for them to know what they are. Nevertheless, one can mention as illustrative thereof ethanol, toluene, methyl ethyl ketone, n-butyl acetate, acetone, ethyl acetate, cyclohexanone, isopropanol and mixtures of the foregoing. The addition of dry nitrocellulose is preferred in applications in which it is desired to have the radiation curable coating composition completely free of volatile solvents.

To stabilize the nitrocellulose against denitration when the radiation curable coating compositions are stored at room temperature for long periods or stored at elevated temperature, it is preferred to have present in the radiation curable coating composition a sufficient amount of phosphoric acid to adjust the pH to between 4.2 and 5.2, preferably between 4.9 and 5.2, measured at a concentration of 10 volume percent of radiation curable coating composition in a 50/50 weight mixture of isopropanol and water. When phosphoric acid is thus added, it is preferred to have present in the composition an alkyl alcohol having from 1 to 4 carbon atoms in an amount from 2.5 to 4 times, and preferably from 3 to 4 times, by weight of the amount of phosphoric acid present. It has been observed that the effectiveness of nitrocellulose in inhibiting penetration of the radiation curable composition into a porous substrate is somewhat impaired by the presence of phosphoric acid when the alkyl alcohol is not present, but when both the alkyl alcohol and acid are present improved stability of the nitrocellulose is achieved without any loss of resistance to penetration of porous substrates.

The nitrocellulose and, optionally, the solvents, phosphoric acid and alkyl alcohol can be added to the acrylate or methacrylate-containing radiation curable coating compositions by any method suitable for achieving a uniform composition. Temperature of addition is not critical and a uniform composition can usually be achieved by mixing at room temperature, however, one may find that a uniform composition is obtained more readily at a somewhat elevated temperature, especially when dry nitrocellulose is added to the radiation curable composition.

The examples which follow are intended to illustrate the invention and are not meant in any way to limit it. In the examples, the amount of time necessary for a radiation curable composition to penetrate a substrate, referred to as "holdout", was determined by placing a drop of the radiation curable composition onto the substrate and observing the time required for the composition to penetrate the substrate, as indicated by the initial appearance of a grey stain. Rub resistance of the cured coatings was determined by rubbing two cured coated samples against each other, at a rate of 50 cycles per minute under a load of 20 p.s.i., and recording the number of cycles required to penetrate through the coating on either sample. Viscosities of the nitrocellulose were determined by the falling ball method described in ASTM D301-56(65) and D1343-56(65). Viscosities of the radiation curable compositions were determined by measuring the amount of time necessary for the composition to drain from a #2 Zahn cup at 25° C. The acrylated epoxidized linseed oil used had an average of 2.8 acrylyl groups per molecule. The silicone slip additive employed as a component of some of the radiation curable compositions had the formula:

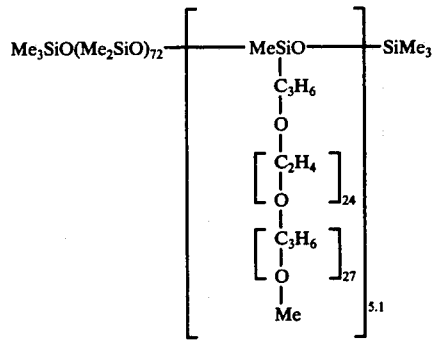

where Me is methyl.

EXAMPLE 1

A nitrocellulose solution was prepared as indicated in the table below. The nitrocellulose used had a viscosity of ½ second and a nitrogen content of 11%. A radiation curable coating containing the nitrocellulose solution was prepared by stirring to a uniform mixture the components indicated below as Coating Formulation I. A control composition was prepared without nitrocellulose and is indicated below as Coating Formulation II.

| Nitrocellulose Solution | Parts by weight |
|---|---|
| Nitrocellulose | 14 |
| n-butyl acetate | 25 |
| Methyl ethyl ketone | 30 |
| Toluene | 25 |

-continued

| Nitrocellulose Solution | Parts by weight |
|---|---|
| Ethanol | 6 |

| Coating Formulation | Parts by weight | |
|---|---|---|
| | I | II |
| Acrylated epoxidized linseed oil | 27 | 30 |
| Neopentyl glycol diacrylate | 49.5 | 55 |
| 2-Ethyl hexyl acrylate | 13.5 | 15 |
| Diethoxyacetophenone | 1 | 1 |
| Nitrocellulose solution | 10 | — |

A drop of each coating formulation was applied to a bleached, clay coated paperboard. Coating Formulation I had a holdout time of greater than 60 seconds, while Coating Formulation II penetrated into the substrate immediately. In this example and all of the examples that follow the uncured radiation curable compositions of this invention had a characteristic hazy appearance.

EXAMPLE 2

Three solutions, identified A, B and C, were each prepared by mixing a solution of 70 weight percent nitrocellulose in ethanol with a solution of 80 volume percent acetone and 20 volume percent toluene, to produce a solution containing 33 weight percent nitrocellulose. The viscosity and nitrogen content of the nitrocellulose used in each solution varied, as indicated below:

| Solution | Viscosity, sec. | Nitrogen content, weight per cent |
|---|---|---|
| A | 0.25 | 11 |
| B | 0.5 | 11 |
| C | 0.5 | 12 |

Four radiation curable coating compositions, identified as I through IV in the table below, were prepared using the nitrocellulose solutions. Composition I was produced by mixing the components at room temperature. Composition II was produced by mixing at a temperature of 70° C. for 60 minutes. Compositions III and IV were produced by mixing the first four components shown in the table and heating to 90° C. with efficient mixing, adding the diethyoxyacetophenone when the mixture had cooled to about 70° C., adding the silicone slip additive when the mixture had cooled to about 60° C. and adding the nitrocellulose solution when the mixture had cooled to between 30° C. and 40° C.

Radiation curable compositions I and II were applied by drops to a smooth quality, clay-coated paperboard. Radiation curable compositions III and IV were applied by drops to a more porous clay-coated paperboard. The holdout times are indicated in the table below. In each case, the holdout time is sufficient to allow curing by radiation before penetration occurs.

| Coating Formulation | I | II | III | IV |
|---|---|---|---|---|
| Acrylated epoxidized linseed oil | 27.5 | 27.5 | 26 | 26 |
| Neopentyl glycol diacrylate | 53 | 53 | 58.4 | 58.4 |
| 2-Ethyl hexyl acrylate | 15 | 15 | 15 | 15 |
| Oleamide | — | — | 4 | 4 |
| Diethoxyacetophenone | 1 | 1 | 2 | 2 |
| Silicone slip additive | — | — | 0.1 | 0.1 |

-continued

| Coating Formulation | I | II | III | IV |
|---|---|---|---|---|
| Nitrocellulose solution | 4.5 | 4.5 | 4.5 | 4.5 |
| Nitrocellulose solution type | A | B | C | A |
| Holdout, seconds | 30 | 30 | 15 | 15 |

EXAMPLE 3

Nine radiation curable coating compositions, containing varying amounts of nitrocellulose, were produced by mixing the components indicated in Table I. The first four components in the table were mixed at a temperature of 90° C. for 60 minutes. The mixture was allowed to cool and when the temperature reached 70° C. the diethoxyacetophenone was added, when the temperature reached 60° C. the silicone slip additive was added and when the mixture had cooled to between 30° C. and 40° C. the nitrocellulose solution was added. The nitrocellulose which was used had a nitrogen content of 11% and a viscosity of ¼ second. The nitrocellulose solution indicated in Table I was produced by mixing a solution of 70 weight percent nitrocellulose in ethanol with a solution of 80 volume percent acetone, 20 volume percent toluene, to produce a solution containing 33 weight percent nitrocellulose. The #2 Zahn cup viscosity of each coating composition was measured, the compositions were applied, dropwise, to a bleached, clay-coated paperboard and to a clay-coated paper, and the holdout time was measured. A control composition was prepared by mixing the components indicated in Table I with no nitrocellulose and the control composition was tested in a manner similar to the nitrocellulose containing compositions. Holdout times and viscosities are reported in Table II

TABLE I

| Component | grams |
|---|---|
| Acrylated epoxidized linseed oil | 28 |
| Neopentyl glycol diacrylate | 61 |
| 2-Ethyl hexyl acrylate | 5 |
| Oleamide | 4 |
| Diethoxyacetophenone | 2 |
| Silicone slip additive | 0.1 |
| Nitrocellulose solution, | |
| composition 1 | 0.75 |
| composition 2 | 1.5 |
| composition 3 | 3 |
| composition 4 | 4.5 |
| composition 5 | 6 |
| composition 6 | 7.5 |
| composition 7 | 9 |
| composition 8 | 18 |
| composition 9 | 27 |

TABLE II

| | | Holdout, seconds | |
|---|---|---|---|
| Composition No. | Viscosity, seconds | Paperboard | Paper |
| Control | 24 | 0 | 30 |
| 1 | 24 | 2 | 40 |
| 2 | 24.5 | 6 | 50 |
| 3 | 26 | 12 | 70 |
| 4 | 30 | 17 | 120 |
| 5 | 32 | 27 | 150 |
| 6 | 34 | 27 | 150 |
| 7 | 36 | 27 | 170 |
| 8 | 49 | 17 | 190 |
| 9 | 63 | 17 | 310 |

In all cases, the formulations containing nitrocellulose showed better resistance to penetration of the substrates than the control. The viscosities of radiation curable coating compositions 1 through 9 were such that they could be applied with conventional coating equipment.

EXAMPLE 4

A series of five radiation curable coating compositions were produced by mixing to a uniform composition the components indicated in the table below. The nitrocellulose employed had a nitrogen content of 11% and a viscosity of ¼ second. The nitrocellulose solution indicated in the table was produced by mixing a solution of 70 weight percent nitrocellulose in ethanol with a solution of 80 volume percent acetone, 20 volume percent toluene, to produce a solution containing 33 weight percent nitrocellulose. The urethane oligomer indicated in the table was a mixture of (a) the adduct of 0.75 parts by weight of a polycaprolactone polyol having a molecular weight of 530 and a hydroxyl number of 212, 0.25 parts by weight of a polycaprolactone polyol having a molecular weight of 830 and a hydroxyl number of 135, 2 parts by weight of isophorone diisocyanate and 2 parts of 2-hydroxyethyl acrylate, (b) the adduct of 1 part by weight isophorone diisocyanate and 2 parts by weight 2-hydroxyethyl acrylate and (c) 2-hydroxyethyl acrylate monomer, the mixture containing 74 weight percent of (a), 16 weight percent of (b) and 10 weight percent of (c). Each of the coating compositions was applied, dropwise, to a bleached, clay coated paperboard to determine the holdout time. Each coating composition was then applied to a bleached, clay coated paperboard substrate by a 360 lines per inch engraved gravure roll which delivered a coating weight of 0.5 lb./1,000 sq. ft. The coatings were cured by a 1 second exposure to ultraviolet light of substantially 2537 Angstroms by the process described in U.S. Pat. No. 3,840,448. All of the cured coatings had a clear appearance. The cured coatings on the substrates were tested for rub resistance. The results of this example, reported in the table below, illustrate that the coatings of our invention have resistance to penetration of the substrate in the uncured state, good rub resistance in the cured state and have sufficiently low viscosities to allow ease of application by a gravure roll.

| Coating composition | A | B | C | D | E |
|---|---|---|---|---|---|
| Acrylated epoxidized linseed oil | 28.5 | 28.5 | 28.5 | 28.5 | 14 |
| Urethane oligomer | — | — | — | — | 14.5 |
| Neopentyl glycol diacrylate | 55 | 65 | 60 | 60 | 60 |
| Methyl carbamylethyl acrylate | — | — | — | 10 | — |
| Hydroxyethyl acrylate | — | — | 10 | — | — |
| 2-Ethylhexyl acrylate | 15 | 5 | — | — | 10 |
| Diethoxyacetophenone | 1 | 1 | 1 | 1 | 1 |
| Silicone slip additive | 0.1 | 4.5 | 4.5 | 4.5 | 4.5 |
| Nitrocellulose solution | 4.5 | 4.5 | 4.5 | 4.5 | 4.5 |
| No. 2 Zahn viscosity, seconds | 26 | 26 | 27 | 33 | 26 |
| Holdout, seconds | 40 | 60 | 40 | 40 | 30 |
| Rub resistance, cycles | 20 | 80 | 200 | 30 | 180 |

EXAMPLE 5

Two radiation curable coating compositions were prepared by mixing 1½ weight percent dry nitrocellulose into the following mixture at a temperature of 70° C.

| Component | Parts by weight |
|---|---|
| Acrylated epoxidized linseed oil | 29 |
| Neopentyl glycol diacrylate | 55 |
| 2-ethyl hexyl acrylate | 15 |

| Component | Parts by weight |
|---|---|
| Diethoxyacetophenone | 1 |

One radiation curable coating composition used nitrocellulose having a viscosity of ¼ second and a nitrogen content of 11%. The other radiation curable coating composition used a nitrocellulose having a viscosity of ½ second and a nitrogen content of 11%. Both uncured compositions appeared slightly hazy and displayed a holdout time of 15 seconds when applied by drops to a cardboard stock of the type used for Coca Cola ® cartons. The radiation curable compositions containing the nitrocellulose having a ¼ second viscosity had a No. 2 Zahn cup viscosity of 40 seconds. The radiation curable coating composition containing the nitrocellulose having a ½ second viscosity had a No. 2 Zahn cup viscosity of 43 seconds. The results of this example illustrate that the nitrocellulose may be added to the radiation curable composition as a dry resin where it is desired to have a composition which is 100 percent free of volatile solvents. The holdout times achieved are more than adequate to allow curing of the compositions prior to penetration of the substrate by the uncured compositions and the viscosities are low enough that they can be applied by conventional coating methods.

EXAMPLE 6

To determine the effect of acidity on the stability of radiation curable coating compositions containing nitrocellulose, a series of radiation curable coating compositions containing varying amounts of phosphoric acid were prepared by mixing to a uniform composition the components indicated in the table below. The first four components in the table were mixed for 60 minutes at about 90° C. When the mixture had cooled to about 60° C. the diethoxyacetophenone, silicone slip additive and phosphoric acid were added with mixing, followed by the addition of the nitrocellulose solution with mixing. An aqueous wash was prepared by mixing a 10 ml. portion of each radiation curable coating composition with 90 ml. of a 50/50 weight mixture of isopropanol and water (pH=7.7) and the pH of the aqueous wash was measured. A few drops of each of the radiation curable coating compositions were applied to a cardboard stock of the type used for Coca Cola ® cartons to determine holdout time. Hellige Color Indexes of the radiation curable coating compositions were measured, they were placed in a forced air oven at 60° C. for 2 days and Hellige Color Index and holdout time were again measured. The results, indicated below, show that the radiation curable coating composition having an aqueous wash pH of 4.9 had excellent color and holdout stability after storage for 2 days at elevated temperature. It is believed that results similar to those of this example would be observed if the radiation curable coating compositions were stored at room temperature for extended periods.

| Coating formulation | Parts by weight |
|---|---|
| Acrylated epoxidized linseed oil | 26 |
| Neopentyl glycol diacrylate | 59 |
| 2-ethylhexyl acrylate | 5 |
| Oleamide | 4 |
| Diethoxyacetophenone | 2 |
| Silicone slip additive | 0.1 |
| Nitrocellulose solution* | 4.5 |

-continued

| Coating formulation | Parts by weight |
|---|---|
| Phosphoric acid | as shown below |

*The same nitrocellulose solution as was employed in Example 3.

| Coating composition | A | B | C | D | E | F | G |
|---|---|---|---|---|---|---|---|
| Phosphoric acid, p.b.w. | 0 | 0.03 | 0.06 | 0.1 | 0.3 | 0.6 | 1.0 |
| Aqueous wash pH | 5.9 | 5.7 | 5.6 | 5.4 | 4.9 | 4.7 | 4.2 |
| Initial Color Index, Hellige | 5 | 5 | 5 | 5 | 5 | 5 | 5 |
| Initial holdout, seconds | 15 | 30 | 30 | 15 | 15 | 3 | 3 |
| Color Index after days Hellige | 12 | 11.5 | 11.5 | 10.5 | 5 | 6 | 6 |
| Holdout after 2 days, seconds | 0 | 0 | 0 | 3 | 15 | 3 | 3 |

Radiation curable composition E was kept in an oven for 2 months at 60° C, after which the Hellige Color Index was 11.5 and holdout time 15 seconds.

EXAMPLE 7

A series of nitrocellulose solutions containing from 0% to 25% by weight of ethanol were prepared by mixing the components indicated in the table below.

| Nitrocellulose solution | Weight per cent | | | | | | |
|---|---|---|---|---|---|---|---|
| | A | B | C | D | E | F | G |
| Acetone | 53.6 | 51.6 | 49.6 | 45.6 | 41.6 | 37.6 | 33.6 |
| Toluene | 13.4 | 12.9 | 12.4 | 11.4 | 10.4 | 9.4 | 8.4 |
| Ethanol | 0 | 2.5 | 5 | 10 | 15 | 20 | 25 |
| Nitrocellulose | 33 | → | | | | | |

| Coating formulation | Parts by weight |
|---|---|
| Acrylated epoxidized linseed oil | 26 |
| Neopentyl glycol diacrylate | 58.1 |
| 2-Ethylhexyl acrylate | 5 |
| Oleamide | 4 |
| Diethoxyacetophenone | 2 |
| Silicone slip additive | 0.1 |
| Nitrocellulose solution | 4.5 |

The nitrocellulose used had a viscosity of ¼ second and a nitrogen content of 11%. A series of radiation curable compositions containing the nitrocellulose solutions were prepared by mixing to a uniform composition the indicated components. The first four components indicated in the table were mixed for 60 minutes at about 90° C. and the mixture was allowed to cool. When the temperature of the mixture reached about 60° C. the diethoxyacetophenone and silicone slip additive were added with mixing. The nitrocellulose solution was added with mixing at 30° C–40° C. Each of the solutions was applied by drops to cardboard stock of the type used for Coca Cola ® cartons and holdout time was measured. There was then added to each radiation curable composition 0.3 parts by weight of phosphoric acid. Each of the solutions was again applied by drops to the same cardboard stock to determine holdout time. Comparison of holdout times before and after addition of the phosphoric acid indicates that the inclusion of at least 20% by weight of ethanol in the nitrocellulose solution, equivalent to 0.9% by weight of the radiation curable composition, prevented the addition of phosphoric acid as a stabilizer from having an adverse effect on holdout time. Holdout times for the radiation curable compositions incorporating nitrocellulose solutions A through G above, are indicated below:

| Nitrocellulose solution used | A | B | C | D | E | F | G |
|---|---|---|---|---|---|---|---|
| Holdout, seconds Before phosphoric acid addition | 15–20 | → | | | | | |
| After phosphoric acid addition | 3 | 3 | 3 | 3 | 3 | 15–20 | 15–20 |

EXAMPLE 8

A solution was prepared by mixing a solution of 70 weight percent nitrocellulose in ethanol with a solution of 80 volume percent acetone and 20 volume percent toluene, to produce a solution containing 33 weight percent nitrocellulose. The nitrocellulose used had a viscosity of ¼ second and a nitrogen content of 11%. A series of four radiation curable coating compositions incorporating the nitrocellulose solution thus produced, identified A, B, C and D, were produced by mixing the components indicated below to a uniform consistency at room temperature. Radiation curable coating composition A, which contained an oligomeric polyacrylate (acrylated epoxidized linseed oil), had a hazy appearance, while compositions B, C and D, which contained no oligomeric polyacrylate or polymethacrylate, were clear in appearance. All the radiation curable coating compositions were tested for viscosity and holdout on bleached, clay coated paperboard. The results, reported below, illustrate that the radiation curable coating compositions which are useful in this invention must contain an oligomeric polyacrylate or polymethacrylate component.

| Coating Formulation | A | B | C | D |
|---|---|---|---|---|
| Acrylated epoxidized linseed oil | 26 | — | — | — |
| Neopentyl glycol diacrylate | 58.4 | 95.5 | 18.8 | — |
| Trimethylolpropane triacrylate | — | — | 76.7 | 95.5 |
| 2-Ethylhexyl acrylate | 5 | — | — | — |
| Oleamide | 4 | — | — | — |
| Diethoxyacetophenone | 2 | — | — | — |
| Silicone slip additive | 0.1 | — | — | — |
| Nitrocellulose solution | 4.5 | 4.5 | 4.5 | 4.5 |
| No. 2 Zahn cup viscosity | 28 | 17 | 27 | 46 |
| Holdout, seconds | 15–20 | 0 | 0 | 0 |

What is claimed is:

1. In an acrylate or methacrylate-based radiation curable coating composition containing at least 10 weight percent of an oligomeric polyacrylate or polymethacrylate having a molecular weight from 800 to 5,000 and an average of 1 to 8 acrylyl groups per 1,000 molecular weight units, the improvement of having present in said radiation curable coating composition from 0.25 to 9 weight percent of nitrocellulose having a viscosity of ¼ second to ½ second, measured by the falling ball method described in ASTM D301-56(65) and ASTM D1343-56(65), and an average nitrogen content from 10.9 to 12.2 weight percent.

2. A radiation curable coating composition as claimed in claim 1, wherein said oligomeric polyacrylate or polymethacrylate has a molecular weight from 1,500 to 2,500.

3. A radiation curable coating composition as claimed in claim 1, wherein there is present from 1 to 3 weight percent of said nitrocellulose.

4. A radiation curable coating composition as claimed in claim 1, wherein there is additionally present in the radiation curable coating composition a sufficient amount of phosphoric acid to adjust the pH to between 4.2 and 5.2, measured at a concentration of 10 volume percent of radiation curable coating composition in a 50/50 weight mixture of isopropanol and water.

5. A radiation curable coating composition as claimed in claim 1, wherein there is additionally present in the radiation curable coating composition a sufficient amount of phosphoric acid to adjust the pH to between 4.9 and 5.2, measured at a concentration of 10 volume percent of radiation curable coating composition in a 50/50 weight mixture of isopropanol and water.

6. A radiation curable coating composition as claimed in claim 4, wherein there is additionally present in the radiation curable coating composition an alkyl alcohol having from 1 to 4 carbon atoms in an amount from 2.5 to 5 times by weight the amount of phosphoric acid present.

7. A radiation curable coating composition as claimed in claim 4, wherein there is additionally present in the radiation curable coating composition an alkyl alcohol having from 1 to 4 carbon atoms in an amount from 3 to 4 times by weight the amount of phosphoric acid present.

8. A radiation curable coating composition as claimed in claim 5, wherein there is additionally present in the radiation curable coating composition an alkyl alcohol having from 1 to 4 carbon atoms in an amount from 2.5 to 5 times by weight the amount of phosphoric acid present.

9. A radiation curable coating composition as claimed in claim 5, wherein there is additionally present in the radiation curable coating composition an alkyl alcohol having from 1 to 4 carbon atoms in an amount from 3 to 4 times by weight the amount of phosphoric acid present.

* * * * *